US009645523B2

(12) United States Patent
Masuyama

(10) Patent No.: US 9,645,523 B2
(45) Date of Patent: May 9, 2017

(54) METHOD FOR MANUFACTURING TONER SUPPLY ROLLER

(71) Applicant: BRIDGESTONE CORPORATION, Tokyo (JP)

(72) Inventor: Toru Masuyama, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 122 days.

(21) Appl. No.: 14/403,257

(22) PCT Filed: May 27, 2013

(86) PCT No.: PCT/JP2013/064664
§ 371 (c)(1),
(2) Date: Nov. 24, 2014

(87) PCT Pub. No.: WO2013/180070
PCT Pub. Date: Dec. 5, 2013

(65) Prior Publication Data
US 2015/0153676 A1   Jun. 4, 2015

(30) Foreign Application Priority Data
May 29, 2012   (JP) .................................. 2012-121903

(51) Int. Cl.
*B29C 43/02* (2006.01)
*B29C 59/02* (2006.01)
(Continued)

(52) U.S. Cl.
CPC ....... *G03G 15/0808* (2013.01); *B29C 43/003* (2013.01); *B29C 43/021* (2013.01);
(Continued)

(58) Field of Classification Search
CPC . B29C 43/02; B29C 43/021; B29C 2043/022; B29C 2043/023;
(Continued)

(56) References Cited

U.S. PATENT DOCUMENTS 5,893,821 A    4/1999  Ando et al.
5,930,570 A *  7/1999  Saito .................. G03G 15/0808
                                                    399/272
(Continued)

FOREIGN PATENT DOCUMENTS

EP      0892320 A2    1/1999
JP      8332679 A    12/1996
(Continued)

OTHER PUBLICATIONS

Machine Translation of JP 11-95541 A (published on Apr. 9, 1999).*
(Continued)

*Primary Examiner* — Leo B Tentoni
(74) *Attorney, Agent, or Firm* — Sughrue Mion, PLLC

(57) ABSTRACT

Provided is a technique for manufacturing a toner supply roller in which the toner conveying performance and the scraping performance of unneeded toner are excellent as well as the above-mentioned problems in molding can be resolved. Also provided is a method for manufacturing a toner supply roller including: an insertion process in which a roller member 10 comprising a shaft 11 and an elastic layer 12 composed of a foam having a columnar shape supported on the outer periphery of the shaft is inserted into a cylindrical forming tool m having on the inner peripheral surface irregular concaves and convexes or a recessed groove along the longitudinal direction; a transfer process in which the roller member inserted into the cylindrical forming tool is heated and the irregular concaves and convexes or the recessed groove along the longitudinal direction on the inner (Continued)

peripheral surface of the cylindrical forming tool are transferred on the surface of the roller member; and a releasing process in which the roller member on the surface of which the irregular concaves and convexes or the recessed groove along the longitudinal direction are transferred is taken out from the cylindrical forming tool to obtain a roller.

4 Claims, 4 Drawing Sheets

(51) Int. Cl.
*F16C 13/00* (2006.01)
*G03G 15/08* (2006.01)
*B29C 44/56* (2006.01)
*B29C 43/00* (2006.01)
*B29C 43/18* (2006.01)
*B29C 43/36* (2006.01)
*B29K 75/00* (2006.01)
*B29K 105/04* (2006.01)
*B29K 705/00* (2006.01)
*B29L 31/32* (2006.01)
*B29L 31/00* (2006.01)

(52) U.S. Cl.
CPC .......... *B29C 43/027* (2013.01); *B29C 43/18* (2013.01); *B29C 43/36* (2013.01); *B29C 44/5627* (2013.01); *B29C 2043/181* (2013.01); *B29K 2075/00* (2013.01); *B29K 2105/04* (2013.01); *B29K 2705/00* (2013.01); *B29K 2905/00* (2013.01); *B29K 2995/0063* (2013.01); *B29L 2031/324* (2013.01); *B29L 2031/767* (2013.01)

(58) Field of Classification Search
CPC ........ B29C 2043/024; B29C 2043/025; B29C 43/027; B29C 2043/028; B29C 2043/029; B29C 43/18; B29C 43/183; B29C 43/184; B29C 44/5627; B29C 59/02; B29L 2031/324; F16C 13/00; G03G 15/08; G03G 15/0808
USPC ............... 264/138, 293, 320, 321, 322, 325; 29/895, 895.2, 895.21, 895.3
See application file for complete search history.

(56) References Cited

U.S. PATENT DOCUMENTS

| | | | |
|---|---|---|---|
| 6,149,564 | A | 11/2000 | Nozawa et al. |
| 2011/0206421 | A1 | 8/2011 | Masuyama et al. |

FOREIGN PATENT DOCUMENTS

| | | | |
|---|---|---|---|
| JP | 8334971 | A | 12/1996 |
| JP | 9-297512 | A | 11/1997 |
| JP | 11-38749 | A | 2/1999 |
| JP | 11-95541 | A | 4/1999 |
| JP | 2002-236416 | A | 8/2002 |
| JP | 2002-296896 | A | 10/2002 |
| JP | 2002-347040 | A | 12/2002 |
| JP | 2006-84651 | A | 3/2006 |
| JP | 2007286271 | A | 11/2007 |
| WO | 2010/041718 | A1 | 4/2010 |

OTHER PUBLICATIONS

International Search Report for PCT/JP2013/064664 dated Jun. 18, 2013.
Communication dated Jan. 27, 2016, from the European Patent Office in counterpart application No. 13796300.5.
Communication dated Sep. 13, 2016, from the Japanese Patent Office in counterpart application No. 2012-121903.

* cited by examiner (a)

(b)

(c)

(d)

(e)

(a)

(b)

(c)

(a)

(b)

METHOD FOR MANUFACTURING TONER SUPPLY ROLLER

CROSS REFERENCE TO RELATED APPLICATIONS

This application is a National Stage of International Application No. PCT/JP2013/064664 filed May 27, 2013, claiming priority based on Japanese Patent Application No. 2012-121903 filed May 29, 2012, the contents of all of which are incorporated herein by reference in their entirety.

TECHNICAL FIELD

The present invention relates to a method for manufacturing a toner supply roller and a toner supply roller (hereinafter, simply also referred to as "a manufacturing method" and "a roller"), and more particularly to a method for manufacturing a toner supply roller which is used in an image forming apparatus such as a copying machine or a printer for supplying toner to a developing roller which conveys toner to an image forming body such as a photoreceptor or a paper and forms a visible image on the surface of the image forming body, and a toner supply roller obtained by the manufacturing method.

BACKGROUND ART

In general, as illustrated in FIG. 3, a developing unit in an electrophotographic image forming apparatus such as a copying machine or a printer, or the like is provided with: an image forming body 21 such as a photoreceptor which holds an electrostatic latent image; a developing roller 22 which abuts on the image forming body 21 and makes the electrostatic latent image into a visible image by attaching toner 20 supported on the surface thereof; and a toner supply roller 1 which supplies toner 20 to the developing roller 22, and an image is formed by a series of processes in which toner 20 is conveyed from a toner storing unit 23 to the image forming body 21 via the toner supply roller 1 and the developing roller 22. In the figure, the reference sign 24 indicates a layer forming blade, the reference sign 25 indicates a charging roller, the reference sign 26 indicates a transfer roller, the reference sign 27 indicates a cleaning unit, and the reference sign 28 indicates a cleaning blade.

Since a toner thin layer is needed to be uniformly formed and supported on the surface of a developing roller without unevenness in order to perform a favorable image formation in such a developing mechanism, in addition to the toner holding performance or the like of the developing roller itself, the performance of the toner supply roller, in particular, the surface performance is important. In other words, a toner supply roller is demanded to form a uniform toner layer on the surface of the developing roller by abutting on the developing roller and performing frictional electrification, supply (conveying) of toner and scraping off unneeded toner.

In order to obtain a toner supply roller having a favorable surface performance which can satisfy the above-mentioned demands, various studies have conventionally been made repeatedly. For such a toner supply roller, a foam such as polyurethane foam used as a roller member is generally known. Examples of a method for preparing polyurethane foam to be used for a toner supply roller include a method in which a urethane raw material is foamed in a mold having a desired roller shape, and a method in which a polyurethane foam having a desired roller shape is obtained by cutting out from a polyurethane block and polishing the cut-out block. In the latter method, in order to remove a fluff on the surface of the polyurethane foam which is generated in the processing, a heating processing is needed to be performed.

As a conventional technique relating to a method for manufacturing a roller, for example, Patent Document 1 discloses a method for manufacturing a roller comprising an elastic layer made of foam, the method comprising: a process for forcing the elastic layer of the roller into a cylindrical member such that it is compressed; a process for heating the outer periphery of the cylindrical member; and a process for taking the roller out from the cylindrical member. Patent Document 2 discloses a technique which uses a mold in which recessed grooves corresponding to a plurality of projecting stripes providing a predetermined concavo-convex surface structure are formed on the inner surface of the mold which forms the outer peripheral surface of a roll in a molding cavity when a toner supply roll is manufactured by foam-molding a polyurethane raw material in a molding cavity which provides a final roll shape.

Further, Patent Document 3 discloses a toner supply roller comprising a metal shaft and a urethane foam layer which is provided on the outer periphery thereof by integral molding, wherein the urethane foam layer is provided with a projection portion having a height of 10 to 200 μm on the surface thereof, and the projection portion is formed in a mold in which the metal shaft and the urethane foam layer are integrally molded. Still further, Patent Document 4 discloses a technique in which a toner conveying roller comprising a shaft body and a urethane foam layer provided on the outer periphery thereof wherein irregular concaves and convexes are formed on the outer peripheral surface of the urethane foam layer is manufactured by using a mold for manufacturing a roller in which irregular concaves and convexes are formed on the inner peripheral surface of a mold for forming a roller.

RELATED ART DOCUMENTS

Patent Documents

Patent Document 1: Japanese Unexamined Patent Application Publication No. H09-297512 (Claims or the like)
Patent Document 2: Japanese Unexamined Patent Application Publication No. H11-038749 (Japanese Patent No. 3536598, Claims or the like)
Patent Document 3: Japanese Unexamined Patent Application Publication No. 2002-236416 (Claims or the like)
Patent Document 4: WO2010/041718 (Claims or the like)

SUMMARY OF THE INVENTION

Problems to be Solved by the Invention

According to the technique described in the cited Document 1, a smooth roller without fluffing in which the hardness is low, the cell density on the surface of the elastic layer is high can be obtained. However, in the roller described in the cited Document 1, the toner conveying performance or the scraping performance is insufficient in some cases since the surface is too smooth. Meanwhile, although, according to the techniques described in the cited Documents 2 to 4, the toner conveying performance or the scraping performance is improved, any of these techniques have various difficulties such as a high cost of a mold due to that a roller is manufactured by using the mold which forms the shape of a final product roller, a low durability of a mold due to that corrosion of the mold by an elastic layer material such as a urethane raw material occurs, the need of blending design which is appropriate for molding, as well as difficulties in a post-processing such as providing a function by an impregnating processing because molding is used.

Accordingly, an object of the present invention is to provide a technique for manufacturing a toner supply roller in which the toner conveying performance and the scraping performance of unneeded toner are excellent as well as the above-mentioned problems in molding can be resolved.

Means for Solving the Problems

The present inventor intensively studied to discover that the above-mentioned problems can be resolved by employing the following constitution, thereby completing the present invention.

In other words, the method for manufacturing a toner supply roller of the present invention is characterized by comprising:

an insertion process in which a roller member comprising a shaft and an elastic layer composed of a foam having a columnar shape supported on the outer periphery of the shaft is inserted into a cylindrical forming tool having on the inner peripheral surface irregular concaves and convexes or a recessed groove along the longitudinal direction;

a transfer process in which the roller member inserted into the cylindrical forming tool is heated and the irregular concaves and convexes or the recessed groove along the longitudinal direction on the inner peripheral surface of the cylindrical forming tool are transferred on the surface of the roller member; and a releasing process in which the roller member on the surface of which the irregular concaves and convexes or the recessed groove along the longitudinal direction are transferred is taken out from the cylindrical forming tool to obtain a roller.

In the present invention, the foam is preferably a polyurethane foam. In the present invention, the elastic layer having a columnar shape can be obtained by cutting out from a block foam. In this case, preferably, the elastic layer having a columnar shape is cut out from the block foam such that the axial direction of the columnar shape is in parallel to the foaming direction of the block foam.

The toner supply roller of the present invention is obtained by the method for manufacturing a toner supply roller according to the present invention, wherein the irregular concaves and convexes or a recessed groove along the longitudinal direction are transferred on the surface thereof.

Effects of the Invention

According to the present invention, by employing the above-mentioned constitution, a toner supply roller in which the toner conveying performance and the scraping performance of unneeded toner are excellent and a manufacturing method thereof can be attained. When an elastic layer having a columnar shape is obtained by cutting out from a block foam, problems of molding can also be solved.

MODE FOR CARRYING OUT THE INVENTION

Embodiments of the present invention will be described in detail with reference to the Drawings.

Figure 1:
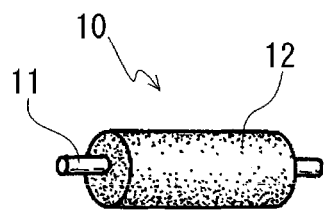
FIG. 1 is a time-series schematic diagram illustrating an embodiment of a method for manufacturing a toner supply roller of the present invention.
Figure 1:
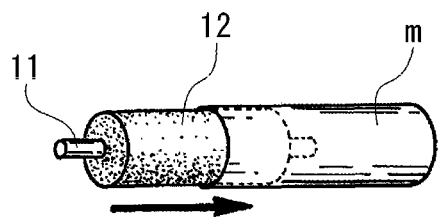
Figure 1:
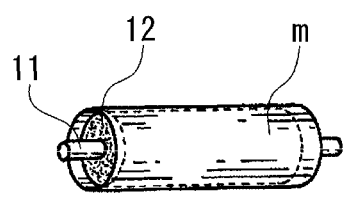
Figure 1:
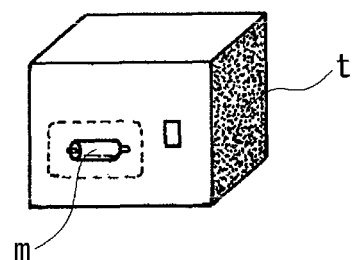
Figure 1:
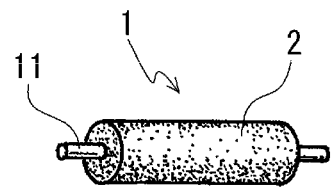

FIG. 1 represents a time-series schematic diagram illustrating an embodiment of a manufacturing method of a foamed roller of the present invention. In the present invention, a roller member 10 is prepared at first as illustrated in FIG. 1(a). The roller member 10 is constituted by a shaft 11 and an elastic layer 12 having a columnar shape composed of a foam supported on the outer periphery of the shaft 11.

The shaft 11 is a rotating shaft in a toner supply roller of the present invention, and the shape, material, size or the like thereof is not particularly restricted, and those applied to a normal toner supply roller can be adopted. For example, the material of the shaft 11 may be a metal or a resin. The shape of the shaft 11 may be a solid shape or a hollow shape. Specific examples thereof include one obtained by coating a steel material such as a sulfur free-cutting steel with nickel zinc or the like; a cored bar constituted by a solid body made of a metal such as iron, stainless steel or aluminum; and a metal shaft such as a metal cylindrical body whose inside is hollowed.

The elastic layer 12 which is supported on the outer periphery of the shaft 11 of the roller member 10 corresponds to an elastic layer of a toner supply roller of the present invention. The elastic layer 12 is fixed with the shaft 11 by an adhesive as needed. For such an adhesive, a two-component polyurethane adhesive, an epoxy adhesive, a polyester adhesive, an acrylic adhesive, an acrylic emulsion adhesive, a urethane emulsion adhesive or the like can be used.

A foam which constitutes the elastic layer 12 is not particularly restricted, and a polyurethane foam is preferably employed. As a polyurethane resin to be used for the polyurethane foam, a material which is conventionally known can be appropriately selected and used and not particularly restricted thereto. The foaming ratio of the polyurethane foam is not particularly restricted, and preferably about 1.2 to 50 times and in particular 10 to 25 times, and the foam density is preferably about 0.04 to 0.1 g/cm$^3$.

The outer diameter of the elastic layer 12 is usually larger than the outer diameter of a toner supply roller to be manufactured in the present invention. The elastic layer 12 preferably has a columnar shape which is similar to the columnar shape of the toner supply roller. The elastic layer 12 having such a columnar shape can be obtained by cutting out a small foam block having a square cross section or a polygonal cross section from a block foam, attaching and fixing the small foam block on the shaft 11, and then working the foam into a columnar shape by a known method, for example, by polishing, grinding or cutting. The elastic layer 12 having a columnar shape can also be obtained by integral molding with the shaft 11 by using a mold having a columnar shape. As mentioned above, since, in the present invention, the method of manufacturing the elastic layer 12 is not restricted, there are a wide variety of materials to be blended, which is advantageous. In some cases, the foam may have a square cross section or a polygonal cross section, not a columnar shape. Since the elastic layer cut out from a block foam is subjected to a surface finishing such as polishing, the elastic layer needs dealing with a fluff; however, in the present invention, a fluff can be dealt with in the below-mentioned transfer process at the same time.

In this case, the elastic layer 12 having a columnar shape is preferably cut out from a block foam such that the axial direction of the columnar shape is in parallel to the foaming direction of the block foam. When the elastic layer 12 having a columnar shape is cut out from a block foam such that the axial direction of the columnar shape is in parallel to the foaming direction of the block foam, unevenness of the cell diameter on the elastic layer 12 in the circumferential direction can be reduced.

Next, as illustrated in FIG. 1(*b*), a cylindrical forming tool m is prepared. The cylindrical forming tool m has a cylindrical shape, and the length in the central axial direction is longer than that of the elastic layer 12 of the roller member 10. The inner diameter thereof is approximately similar to the outer diameter of a toner supply roller to be manufactured, and in view of a gap with the outer diameter of the toner supply roller, the inner diameter thereof is preferably slightly larger than the outer diameter of the toner supply roller. Although also depending on the outer diameter of the toner supply roller, for example, the inner diameter can be 0.1 mm larger than the outer diameter of a toner supply roller.

In the present invention, as illustrated in FIG. 1(*b*), a roller member 10 is inserted from an opening which is one end of such a cylindrical forming tool m. FIG. 1(*c*) illustrates the outer appearance of the cylindrical forming tool m after the roller member 10 is inserted thereinto. In this case, the roller member is inserted while the elastic layer 12 is compressed toward the center in the radial direction such that the outer diameter of the elastic layer 12 of the roller member 10 is larger than the inner diameter of the cylindrical forming tool m. Here, the compression rate (%) of the elastic layer is represented by $\{(R-r)/R\} \times 100$, setting the thickness of the elastic layer 12 of the roller member 10 before the insertion to R and the thickness of the compressed elastic layer 12 after the insertion to r, and the compression rate is preferably 5 to 50%, and more preferably 5 to 20%. When the compression rate is larger than the lower limit, the cell density at the neighborhood of the surface of the elastic layer becomes high, and toner clogging or the like on the surface of the roller can be inhibited. When the compression rate is smaller than the upper limit, an excess compression can be prevented, and the elasticity of the elastic layer can be prevented from being deteriorated.

In the present invention, for the cylindrical forming tool m, one having on the inner peripheral surface irregular concaves and convexes or a recessed groove along the longitudinal direction is used. When the cylindrical forming tool m having on the inner peripheral surface irregular concaves and convexes or a recessed groove along the longitudinal direction is used, by heating a roller member 10 inserted in the cylindrical forming tool m in the below-mentioned transfer process, the irregular concaves and convexes or the recessed groove along the longitudinal direction on the inner peripheral surface of the cylindrical forming tool m are transferred to the surface of the roller member to thereby obtain a roller having on the surface irregular concaves and convexes or a projecting stripe corresponding to the above-mentioned recessed groove along the longitudinal direction. The toner conveying performance and the scraping performance of the obtained toner supply roller can be thereby improved.

Here, the phrase "irregular concaves and convexes are formed on the inner peripheral surface of a cylindrical forming tool m" means that concave portions and convex portions (concaves and convexes) having similar shapes are not provided cyclically in any of the circumferential direction and the axial direction of the cylindrical forming tool m. Irregular concaves and convexes on the inner peripheral surface of the cylindrical forming tool m of the present invention can be provided corresponding to the concavo-convex shape of the surface of a desired toner supply roller. Specifically, for example, preferably, regarding the roughness of the inner peripheral surface of the cylindrical forming tool m in both of the circumferential direction and the axial direction, the arithmetic mean roughness (Ra) is 1 μm or larger, the ten-point mean roughness (Rzjis) is 5 μm or larger, and the mean length of roughness curve element (RSm) in the axial direction is 10 μm or larger. More preferably, regarding the roughness of the inner peripheral surface of the cylindrical forming tool m in both of the circumferential direction and the axial direction, the arithmetic mean roughness (Ra) is 5 to 100 μm, the ten-point mean roughness (Rzjis) 20 to 400 μm, the mean length of roughness curve element (RSm) in the axial direction is 100 to 2000 μm, and the roughness curve skewness (Rsk) in the circumferential direction is −2 to 0.

The phrase "a recessed groove along the longitudinal direction is formed on the inner peripheral surface of the cylindrical forming tool m" means that recessed grooves and projecting stripes each having the same cross sectional shape extending between the both sides of the cylindrical forming tool m along the longitudinal direction are cyclically provided in the circumferential direction of the cylindrical forming tool m. Recessed grooves along the longitudinal direction of the inner peripheral surface of the cylindrical forming tool m of the present invention can be provided corresponding to the concavo-convex shape of the surface of a desired toner supply roller. Specifically, for example, the depth or the height H of a recessed groove or the corresponding projecting stripe along the radial direction of the cylindrical forming tool m can be set to a range of 250 to 1000 μm; the pitch P thereof in the circumferential direction of the cylindrical forming tool m can be set to a range of 500 to 2000 μm; and the width W thereof in the circumferential direction of the cylindrical forming tool m can be set to a range of 250 to 1000 μm (see FIGS. 2(*b*), (*c*)).

Figure 2:
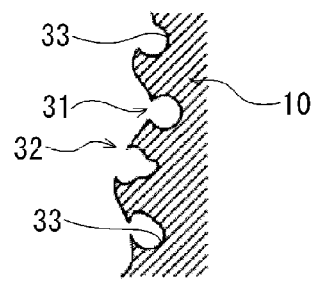
FIGS. 2(a) to (c) are a schematic enlarged partial cross section illustrating the surface shape of the toner supply roller of the present invention.
Figure 2:
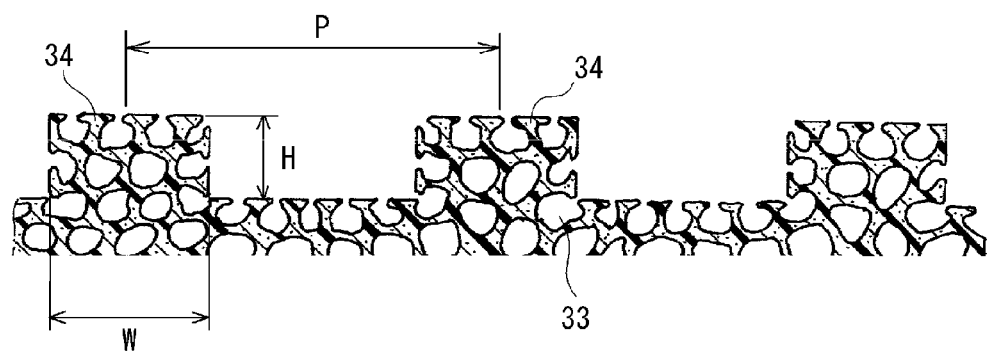
Figure 2:
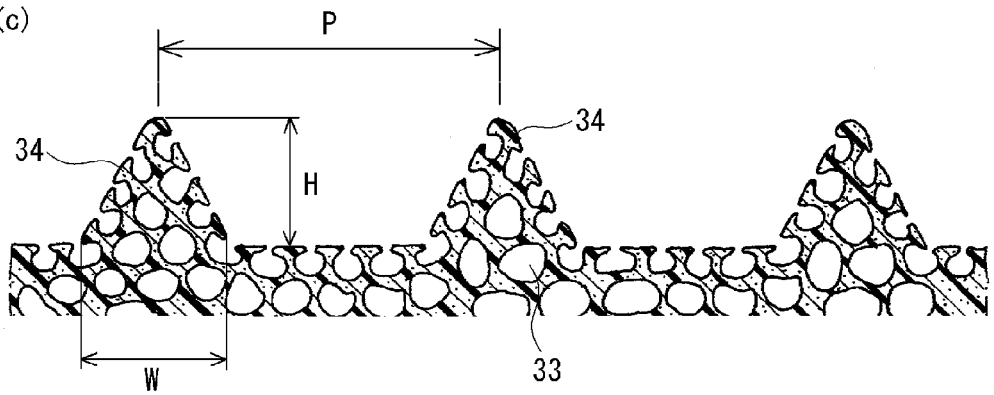
Figure 3:
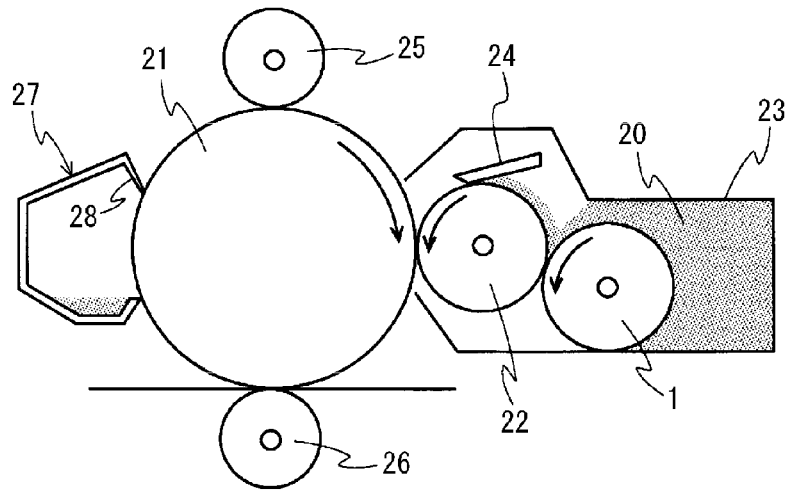
FIG. 3 is a schematic illustration drawing illustrating one example of a developing unit in an electrophotographic image forming apparatus.

By using the cylindrical forming tool m having on the inner peripheral surface thereof irregular concaves and convexes as mentioned above, a toner supply roller provided with an elastic layer 2 having a surface shape on which irregular concaves and convexes (concave portion 31 and convex portion 32) are formed as illustrated in the cross section in FIG. 2(*a*) can be obtained, and the toner conveying performance can be remarkably improved along with a minute cell opening 33 on the surface of the roller as well as the above-mentioned irregular concavo-convex shape.

Here, the elastic layer 2 obtained by using the above-mentioned cylindrical forming tool m has, for example, an arithmetic mean roughness (Ra) of 1 μm or larger, a ten-point mean roughness (Rzjis) of 5 μm or larger, and a mean length of roughness curve element (RSm) of 10 μm or larger both in the circumferential direction and in the axial direction. In particular, regarding the surface of the elastic layer both on the circumferential direction and the axial direction, the arithmetic mean roughness (Ra) can be 5 to 100 μm, the ten-point mean roughness (Rzjis) can be 20 to 400 μm, the mean length of roughness curve element (RSm) in the axial direction can be 100 to 2000 μm, and the roughness curve skewness (Rsk) in the circumferential direction can be 0 to 2.

Figure 4:
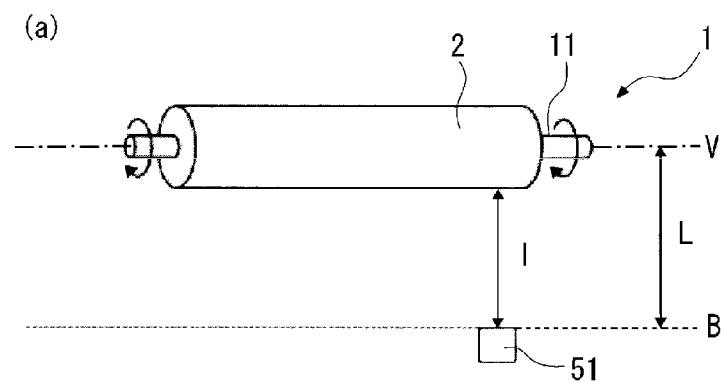
FIG. 4 is an illustration drawing illustrating a method of measuring the roughness of the outer peripheral surface of an elastic layer of a toner conveying roller of the present invention; (a) represents a method of measuring the surface roughness in the circumferential direction, and (b) represents a method of measuring the surface roughness in the axial direction.
Figure 4:
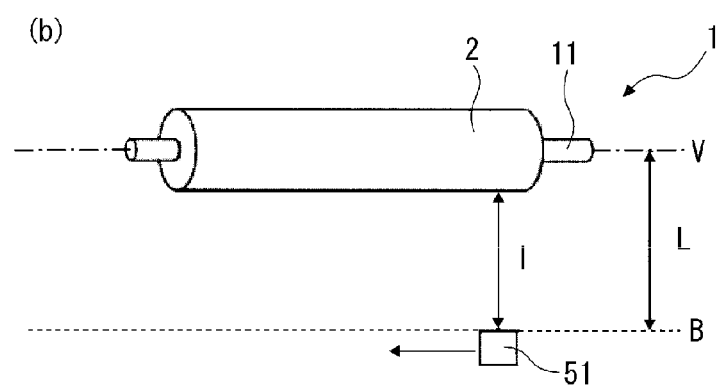

The Ra, Rzjis, and Rsk on the surface of an elastic layer in the circumferential direction mentioned above can be evaluated by a method in accordance with JISB0633: 2001. For example, as illustrated in FIG. 4(a), the shape profile of a roller in the circumferential direction at a predetermined position is determined by using a non-contact laser sizer 51 (manufactured by Keyence Corporation) and measuring the distance 1 from a base line B (a line a distance L distant from a virtual line V which penetrates the center of a shaft 11 of a roller in the axial direction) to the surface of the elastic layer 2 at a predetermined position of the roller 1 by performing the measurement continuously while rotating the roller 1, and the Ra, Rzjis, and Rsk in the circumferential direction can be calculated from the measured shape profile.

The Ra, Rzjis, and RSm on the surface of an elastic layer in the axial direction mentioned above can be evaluated by a method in accordance with JISB0633: 2001. For example, as illustrated in FIG. 4(b), the shape profile of a roller in the axial direction at a predetermined position is determined by using a non-contact laser sizer 51 (manufactured by Keyence Corporation) and measuring the distance 1 from a base line B (a line a distance L distant from a virtual line V which penetrates the center of a shaft 11 of a roller in the axial direction) to the surface of the elastic layer 2 at a predetermined position of the roller by performing the measurement while continuously moving the non-contact laser sizer 51 on the base line in the axial direction (the left direction in FIG. 4(b)), and the Ra, Rzjis, and RSm in the axial direction can be calculated from the measured shape profile.

The method for foaming the above-mentioned irregular concaves and convexes on the inner peripheral surface of the cylindrical forming tool m is not particularly restricted. For example, by using the following methods (1) to (3), desired concaves and convexes can be formed at low cost and easily. In particular, the methods (2) and (3) are preferably used from the viewpoint that the skewness of the inner peripheral surface of the cylindrical forming tool m can be set to a negative value, in other words, the skewness of a roller obtained by using the cylindrical forming tool m can be set to a positive value. Further, the cylindrical forming tool m can be manufactured not only by the following methods (1) to (3) but also by rotary forming using a top having an irregular concavo-convex shape or by rounding an embossed plate having an irregular concavo-convex shape to form a pipe shape.

(1) Blasting

For example, the inner peripheral surface of a cylindrical member (mold member) such as an aluminum pipe (A6063) is processed, for example, by spraying abrasives such as alumina to manufacture a cylindrical forming tool m having on the inner peripheral surface thereof irregular concaves and convexes. Here, the roughness of the inner peripheral surface of the cylindrical forming tool m can be controlled by adjusting the particle size and the shape of abrasives, the discharge pressure of abrasives, and discharge time (processing time) of abrasives.

(2) Powder Sintering

On the inner peripheral surface of a cylindrical member, as needed, for example, a binder such as a spray glue is applied and then a metal particle composed of copper per se or a mixture of copper and SUS is applied thereon to sinter the applied metal particle to thereby manufacture a cylindrical forming tool m having on the inner peripheral surface thereof irregular concaves and convexes. Here, the roughness of the inner peripheral surface of the cylindrical forming tool m can be controlled by adjusting the particle size and the application amount of the metal particle to be applied and the sintering temperature. When sintering is performed by applying a binder, the binder vaporizes during sintering; and therefore, the formation of a roller is not adversely affected by a residual binder in the inner peripheral surface of the manufactured cylindrical forming tool m.

(3) Fluorine Coating

On the inner peripheral surface of a cylindrical member, a particle composed of a resin such as polytetrafluoroethylene (PTFE) or a metal is applied, and on the inner peripheral surface on which the particle is applied, a fluorine coating agent such as PTFE, tetrafluoroethylene.perfluoroalkylvinyl ether copolymer (PFA), tetrafluoroethylene.hexafluoropropylene copolymer (FEP) is applied, and the inner peripheral surface is coated with a fluororesin to thereby manufacture a cylindrical forming tool m having on the inner peripheral surface thereof irregular concaves and convexes. Here, the roughness of the inner peripheral surface of the cylindrical forming tool m can be controlled by adjusting the particle size and the shape of the particle to be applied, and the application amount of the particle. Since the inner peripheral surface of the cylindrical forming tool m manufactured by the method is coated with a fluororesin, the mold releasability is high and fluffing hardly occurs.

By using a cylindrical forming tool m having on the inner peripheral surface thereof a recessed groove along the longitudinal direction, a toner supply roller provided with an elastic layer 2 having a surface shape on which a projecting stripe 34 along the longitudinal direction as illustrated in FIG. 2 (b), (c) extends between the both sides thereof can be obtained, and also in this case, the toner conveying performance can be remarkably improved along with a minute cell opening 33 on the surface of the roller as well as the above-mentioned concavo-convex shape.

The method for forming the above-mentioned recessed groove along the longitudinal direction on the inner peripheral surface of the cylindrical forming tool m is not particularly restricted. For example, etching processing, broaching processing, electrical discharge machining, or cold drawing as well as a method such as casting or electrocasting plating can be used.

Although the cylindrical forming tool m can be made of a resin or a metal, since the tool is heated together with the roller member 10 in a post-process, the tool is preferably made of a metal which has a thermal resistance and a favorable thermal conductivity. Among others, aluminum, copper, iron or the like is preferred. On the inner surface of the cylindrical forming tool m, a lubricative coating which does not contaminate foam such as fluorine coating can be formed in order to reduce the coefficient of friction.

Means of inserting the roller member 10 into the cylindrical forming tool m is not particularly restricted. An appropriate insertion apparatus may be used, or the insertion may be performed manually. It is preferably avoided to insert the roller member 10 while being twisted with respect to the cylindrical forming tool m.

Since the elastic layer 12 is not only compressed in the radial direction but also inserted into the cylindrical forming tool m while being compressed, it is deformed also in the axial direction of the shaft 11. Therefore, when a post-process heating is performed remained in this shape, a distortion is applied to a cell in the foam not only in the radial direction of the elastic layer 12 but also in the axial direction of the shaft 11, whereby the cell becomes in a diagonally deformed state. In order to remove such a distortion, preferably, the roller member 10 after insertion is moved in a direction opposite to the insertion direction. When a post-process heating is performed while maintaining such a shape, the distortion of a cell in the foam in the axial direction of the shaft 11 is removed and the cell becomes in a state in which the cell is deformed in the radial direction. For this reason, clogging of a toner or the like to be conveyed can be prevented, and at the same time, the magnitude of a distortion in the longitudinal direction of the elastic layer does not change in the longitudinal direction of the roller, thereby obtaining favorable image formation characteristics.

Next, as illustrated in FIG. 1(d), the roller member 10 inserted in the cylindrical forming tool m is heated together with the cylindrical forming tool m. Heating means is not particularly restricted. In FIG. 1(d), a conventional heating apparatus t is used. Heating temperature and heating time are also not particularly restricted. In the present invention, from the viewpoint that irregular concaves and convexes or a recessed groove along the longitudinal direction on the inner peripheral surface of the cylindrical forming tool m are transferred to the surface of the roller member 10 by this heating, heating may be performed in accordance with conditions of heating temperature and heating time in which the transfer can be performed. When the foam of the elastic layer 12 is a polyurethane foam, by using a condition of 140° C. or higher and 30 minutes or longer as one example of the heating condition, the transfer can be favorably performed. In particular, when the polyurethane foam is an ether-based polyurethane foam, a more preferred temperature range is from 140° C. to 160° C.; and when the the polyurethane foam is an ester-based polyurethane foam, a more preferred temperature range is from 150° C. to 180° C. Since the effect of the transfer is saturated even when the heating time is too long, the heating time is preferably 60 minutes or shorter from the viewpoint of energy-saving. When the heating temperature is too low, the transfer may be insufficient; on the other hand, when the heating temperature is too high, the roller member 10 may be thermally deteriorated.

As mentioned above, in the present invention, by the above-mentioned transfer process, the above-mentioned irregular concaves and convexes or a recessed groove along the longitudinal direction can be transferred and at the same time, a fluff existing on the surface of the roller member 10 obtained by cutting out from a block foam can also be removed. In practical, in the above-mentioned transfer process, a fluff is removed at first by heating, and at the same time or after that, concaves and convexes are transferred. Therefore, after the heating in the above-mentioned transfer process, in the roller member 10 in the cylindrical forming tool m, a surface without fluffing on which the cell density on the surface of the elastic layer is high and irregular concaves and convexes or a recessed groove along the longitudinal direction are transferred on the surface is obtained. Therefore, by taking out the roller member 10 from the cylindrical forming tool m, a toner supply roller 1 having an elastic layer 2 with the final outer diameter can be obtained without subjecting separately the elastic layer to a diameter reducing processing (FIG. 1(e)).

When, after the above-mentioned heating, the roller member 10 is taken out in a state in which the temperature of the roller member 10 is high, the outer diameter of the elastic layer may be larger than a desired diameter, and a distortion in the axial direction of the shaft may be applied to the elastic layer when the roller member is taken out from the cylindrical forming tool m. Therefore, the roller member 10 is preferably taken out after the temperature thereof is sufficiently reduced, and for example, the roller member is preferably taken out after the temperature thereof is reduced to 50° C. to room temperature. Such temperature lowering is performed by radiational cooling in the air, or gradual cooling in a heating apparatus, and alternatively, for the purpose of reducing the processing time, it is performed by cooling using a cooling apparatus.

In the present invention, since the transfer of concaves and convexes is performed by using a cylindrical forming tool m on the formed elastic layer 12, corrosion of the cylindrical forming tool m due to an elastic layer material does not occur, and therefore, the durability of the cylindrical forming tool m can be maintained at a high level, which is also advantageous.

The toner supply roller 1 of the present invention is obtained by the above-mentioned manufacturing method of the present invention, and comprises a shaft 11 and an elastic layer 2 supported on the outer periphery thereof, wherein irregular concaves and convexes or a recessed groove along the longitudinal direction are transferred on the surface of the elastic layer. In the toner supply roller 1 of the present invention, as illustrated in FIG. 2(a), the outer peripheral surface of the elastic layer is a curved surface constituted by ups and downs of concave portion 31 and convex portion 32, or as illustrated in FIG. 2(b), (c), a projecting stripe 34 is formed, and therefore, a quite favorable toner conveying performance and scraping performance are obtained along with a minute cell opening 33 on the surface of the roller as well as this curved surface or the projecting stripe 34. In the toner supply roller of the present invention, a fluffing on the surface of the elastic layer 2 is also suppressed.

In the present invention, a suitable material for the elastic layer is not particularly restricted, and examples thereof include a thermoplastic foam such as polyethylene, polyvinyl chloride, polystyrene, polyvinyl alcohol, viscose, or ionomer and a thermosetting foam such as polyurethane, rubber foam, epoxy, phenol urea, pyranyl, silicone, or acryl, and polyurethane foam is particularly preferred. Although, for the form of a cell of the elastic layer, any form such as closed-cell or open-cell can be used, open-cell is preferred since a change in the size thereof depending on the temperature is small.

When the material of the elastic layer is urethane, a polyol component is not particularly restricted, and any polyol of hydrophobic polyol and hydrophilic polyol can be used. An isocyanate component is not particularly restricted, and known one can be used.

In particular, when the elastic layer is formed by cutting out from a block foam, for example, those manufactured by stirring and mixing a compound including two or more active hydrogens and a compound including two or more isocyanate groups together with additives such as a catalyst, a foaming agent, and a foam stabilizer to be foamed and hardened can be used as a polyurethane foam which constitutes the block foam. Specific examples thereof suitably include a polyurethane foam manufactured by mixing a polyether polyol containing a single diol mixture including two types of single diols having an average molecular weight difference of 800 to 3600 in a total amount of 50% by weight with respect to a polyol component, isocyanate, water, a catalyst, and a foaming agent, and foam the mixture to be allowed to stand, which is manufactured by a method disclosed in Japanese Patent No. 3480028. The term "single diol" herein means in general a single diol or a group of two or more diols having an average molecular weight difference of 400 or less. The term "average molecular weight difference" means the difference between average molecular weights of the diols in consideration and the largest difference between average molecular weights of the diols in consideration particularly when there are many combinations of diols.

Examples of the polyether polyol used when the above-mentioned polyurethane foam is manufactured include: (1) a polyether polyol of a type in which only a propylene oxide is added to diethylene glycol; (2) a polyether polyol of a type in which a propylene oxide and an ethylene oxide are added in block or randomly to diethylene glycol; and (3) a polyether polyol of a type in which acrylonitrile or styrene is grafted onto the above-mentioned (1) or (2), and a polyether polyol of type (1) is preferably used to obtain a better effect although not particularly restricted thereto.

Examples of an initiator which is used for manufacturing the above-mentioned polyether polyol include polyalcohol, polyphenol, and mono- or poly-amine. Suitably, polyalcohol and polyphenol are used, and particularly suitably, polyalcohol is used. Examples of the polyalcohol include ethylene glycol, diethylene glycol, triethylene glycol, propylene glycol, 1,3-butanediol, and 1,4-butanediol. Among others, diethylene glycol is more preferred.

The above-mentioned polyether polyol component may contain a polyol component other than diol. Examples of such a polyol component include a trifunctional polyol usually used for manufacturing a polyurethane foam such as a polyol in which alkylene oxide such as propylene oxide is added to a glycerin base, or a polyol made by adding two kinds of alkylene oxides such as propylene oxide and ethylene oxide randomly or in block. Examples of a polyfunctional polyol include a polyether polyol or the like in which the same substances as above are added to saccharose base.

For the isocyanate component, tolylene diisocyanate, 4,4-diphenylmethane diisocyanate, polymethylene polyphenyl isocyanate or the like can be used singly or used in combination. Among these, tolylene diisocyanate is particularly preferred.

For the above-mentioned catalyst and foaming agent, the type and the amount thereof used are not particularly restricted and a known catalyst and foaming agent can be appropriately used. Examples of the catalyst include an amine catalyst such as triethylenediamine, tetramethylenehexadiamine, or dimethylcyclohexylamine and an organic tin catalyst such as stannous octoate or dibutyltin dilaurate. Examples of the foaming agent include methylene chloride, CFC-123, and CFC-141b.

Further, to the above-mentioned polyurethane foam, other than the above-mentioned additives, a variety of additives such as a flame retardant, an antioxidant, an ultraviolet absorbing agent, and a foam stabilizer can be appropriately added. Specific examples of the foam stabilizer include a variety of siloxanes, and polyalkylene oxide block copolymers.

Here, examples of a method of imparting an electrical conductivity to the polyurethane foam as a block foam include a method in which a conducting agent is added to the raw materials of the above-mentioned polyurethane foam in advance, and a method in which a conducting agent is impregnated in a manufactured polyurethane foam. The latter method is preferred from the viewpoint of high flexibility of the design. Specifically, a method in which a polyurethane foam is impregnated with an impregnation liquid containing a conducting agent and a binder to impart an electrical conductivity can be used. By appropriately determining the amount of the conducting agent and the amount of the impregnation liquid in the impregnation liquid, the electrical resistivity of the polyurethane foam can be determined to a predetermined value, and the electrical resistivity of the toner supplying roller can be adjusted in the above-mentioned predetermined range.

For the above-mentioned conducting agent, carbonaceous particle such as carbon black or graphite, metal powder such as silver or nickel, electrically conductive metal oxide such as tin dioxide, titanium dioxide, zinc oxide can be used singly. Alternatively, those obtained by covering an insulation particle such as barium sulfate as a core body with the above-mentioned electrically conductive metal oxide in a wet manner, electrically conductive metal carbide, electrically conductive metal nitride, electrically conductive metal boride and the like can be used singly or in combination of a plurality of kinds thereof. From the viewpoint of the cost, carbon black is preferable, and from the viewpoint of controllability of electrical conductivity, electrically conductive metal oxide is preferred. For such a conducting agent, a fine particle having an average particle size of 100 nm or smaller, in particular, 50 nm or smaller is preferably used.

As a binder used for an impregnation liquid, acrylic resins such as acrylate resins, polyacrylate resins, acrylate-styrene copolymer resins, acrylate-vinyl acetate copolymer resins; polyvinyl alcohols, polyacrylamides, polyvinyl chloride resins, urethane resins, vinyl acetate resins, butadiene resins, epoxy resins, alkyd resins, melamine resins, and chloroprene rubbers or the like may be exemplified. Particularly preferred are acrylate resins, urethane resins and chloroprene rubbers. These binders may be used singly, or in combination as a mixture of two or more thereof. Although a conducting agent cannot bind rigidly to the cell wall of polyurethane foam even when the conducting agent is impregnated singly, a conducting agent binds rigidly to the cell wall of polyurethane foam by adding the binder to form a stable conducting agent layer in cells of the polyurethane foam.

The compounding ratio of the above-mentioned conducting agent and binder is preferably 10 to 110 parts by mass, particularly 30 to 50 parts by mass of solid content of the conducting agent with respect to 100 parts by mass of solid content of the binder. When the conducting agent is larger than the above range, adhesion to substrate polyurethane foam tends to be insufficient. On the other hand, when the conducting agent is smaller than the above range, the surface resistance of the toner supplying roller tends to be unstable.

To the above-mentioned impregnation liquid, in addition to a conducting agent and binder, a proper amount of water and an organic solvent such as toluene or ethyl acetate can be added. Such a solvent is preferably added such that the viscosity of the impregnation liquid is about 5 to 300 cps (25° C.). Setting the viscosity in this range makes an adhesion operation by impregnation more readily. Further, to the impregnation liquid, other additives than those mentioned above such as a mineral oil based antifoaming agent, a silicone based antifoaming agent, a surface-active agent, or a charge controlling agent can be added as needed. Such an additive is preferably added in an amount of 0.001 to 10 parts by mass, particularly in an amount of 0.001 to 0.1 parts by mass with respect to 100 parts by mass of the impregnation liquid.

In a method in which electrical conductivity is imparted to a polyurethane foam by using the above-mentioned impregnation liquid, for example, powdery conducting agent and binder are dispersed and contained in water or an organic solvent, as needed, together with other additives to prepare an impregnation liquid; a block-shaped polyurethane foam is immersed in the impregnation liquid; and an air bubble in the polyurethane foam is impregnated with the impregnation liquid. Thereafter, the polyurethane foam is taken out from the impregnation liquid, compressed to remove a residual impregnation liquid, followed by heat drying to remove water or the like, thereby fixing the conducting agent together with the binder in the air bubble of the polyurethane foam.

Examples of the polyol component of the polyurethane foam raw material when an elastic layer is formed by molding which can be used include: polyether polyols made by addition polymerization of ethylene oxide and propylene oxide; polytetramethylene ether glycol; polyesther polyol made by condensing an acid ingredient and a glycol ingredient; polyester polyol made by ring-open polymerization of caprolactone; and polycarbonate diols.

Examples of the polyether polyol which is made by addition polymerization of ethylene oxide and propylene oxide include a polyether polyol which is made by addition polymerization of ethylene oxide and propylene oxide by using, as a starting material, for example, water, propylene glycol, ethylene glycol, glycerin, trimethylol propane, hexane triol, triethanol amine, diglycerine, pentaerythritol, ethylene diamine, methyl glucoside, aromatic diamine, sorbitol, sucrose or phosphoric acid. A polyether polyol which is made by using, as a starting material, water, propylene glycol, ethylene glycol, glycerin, trimethylol propane or hexane triol is particularly preferred. Regarding the percentage of ethylene oxide and propylene oxide to be added and the microstructures of the above-mentioned polyether polyol, those in which the percentage of ethylene oxide is preferably 2 to 95% by mass, and more preferably 5 to 90% by mass, and in which a polyether polyol which has etheylene oxide at a terminal thereof are preferred. The sequence of ethylene oxide and propylene oxide in the molecular chain is preferably random.

Regarding the molecular weight of the polyether polyol, when water, propylene glycol or ethylene glycol is used as a starting material, the polyether polyol is bifunctional, and the molecular weight is preferably in the range of 300 to 6000 in terms of mass-average molecular weight, and more preferably in the range of 3000 to 5000. When glycerin, trimethylol propane or hexane triol is used as a starting material, the polyether polyol is trifunctional, and the molecular weight is preferably in the range of 900 to 9000 in terms of mass-average molecular weight, and more preferably in the range of 4000 to 8000. A mixture of bifunctional polyol and trifunctional polyol may also be used. When the number of functionalities is small and the numbers of functionalities of polyether polyols are the same, the polyether polyol having a larger molecular weight can obtain a polyurethane foam layer with a higher breaking elongation, which is desired.

Polytetramethylene ether glycol may be obtained, for example, by cationic polymerization of tetrahydrofuran. Polytetramethylene ether glycol having a mass-average molecular weight in the range of 400 to 4000, and particularly in the range of 650 to 3000 can be suitably employed. A mixture of polytetramethylene ether glycols having different molecular weights is preferably used. Further, a polytetramethylene ether glycol obtained by copolymerization of alkylene oxide(s) such as ethylene oxide and/or propylene oxide may also be employed.

Further, for the polyol component, a mixture of polytetramethylene ether glycol and polyether polyol made by addition polymerization of ethylene oxide and propylene oxide is preferably used. In this case, a mixture whose mixing ratio (polytetramethylene ether glycol:polyether polyol) is in the range of 95:5 to 20:80 in terms of mass ratio, and particularly, in the range of 90:10 to 50:50 is further preferably used.

The above-mentioned polyol component may be used in combination with polyols such as a polymer polyol which is acrylonitrile modified polyol, a polyol to which melamine is added, diols such as butanediol, trimethylol propane or derivatives thereof.

Examples of the isocyanate component include aromatic isocyanate or derivatives thereof, aliphatic isocyanate or derivatives thereof, or cycloaliphatic isocyanate or derivatives thereof. Among these, aromatic isocyanate or derivatives thereof is preferred, and particularly, tolylene diisocyanate (TDI) or derivatives thereof, diphenylmethane diisocyanate (MDI) or derivatives thereof is suitably used.

As the tolylene diisocyanate or derivatives thereof, crude tolylene diisocyanate, 2,4-tolylene diisocyanate, 2,6-tolylene diisocyanate, a mixture of 2,4-tolylene diisocyanate and 2,6-tolylene diisocyanate, urea modified product thereof, biuret modified product thereof, carbodiimide modified product thereof or urethane modified product modified by, for example, polyol, or the like may be used. As the diphenylmethane diisocyanate or derivatives thereof, for example, a diphenylmethane diisocyanate or derivatives thereof obtained by phosgenating diamino diphenyl methane or derivatives thereof may be used. Examples of the derivatives of diamino diphenyl methane include a polynuclear one, and pure diphenyl methane diisocyanate obtained by diamino diphenyl methane, polymeric diphenylmethane diisocyanate obtained by polynuclear diaminodiphenylmethane, or the like may be used. Regarding polymeric diphenylmethane diisocyanate, a mixture of pure diphenylmethane diisocyanate and polymeric diphenylmethane diisocyanates having a variety of numbers of functionalities is usually used, and those having an average number of functionalities of preferably 2.05 to 4.00, and more preferably 2.50 to 3.50 are used. Derivatives obtained by modifying these diphenylmethane diisocyanates or derivatives thereof such as urethane modified product modified by, for example, polyol, a dimer made by uretdione formation, isocyanurate modified product, carbodiimide/uretonimine modified product, allophanate modified product, urea modified product, biuret modified product may also be used. Also, a mixture of several kinds of diphenylmethane diisocyanates or derivatives thereof may be used.

The isocyanate may be prepolymerized in advance with a polyol, and examples of the method thereof include a method wherein a polyol and an isocyanate are placed in an appropriate container, and the mixture is stirred sufficiently, followed by being stored at 30 to 90° C., more preferably at 40 to 70° C. for 6 to 240 hours, more preferably for 24 to 72 hours. In this case, the ratio of the polyol and the isocyanate is adjusted such that the content of the isocyanate in the obtained prepolymer becomes preferably 4 to 30% by mass, more preferably 6 to 15% by mass. When the content of the isocyanate is less than 4% by mass, the stability of the prepolymer is deteriorated and the prepolymer is cured during storage, so that the prepolymer may not be usable. When the content of the isocyanate is higher than 30% by mass, the amount of isocyanate to be added at the time of the preparation increases and the content of the isocyanate which is not prepolymerized increases, and the isocyanate which is not prepolymerized is cured by a reaction with a polyol component used in the later polyurethane curing reaction by a reaction mechanism similar to the one-shot method not including a prepolymerization reaction, so that the effect by using the prepolymer method decreases. When the isocyanate component to be used is prepared by prepolymerization in advance of isocyanate with a polyol, examples of the polyol component which may be used include, in addition to the above-described polyol compounds, diols such as ethylene glycol and butanediol, polyols such as trimethylolpropane and sorbitol, and derivatives thereof.

In addition to these polyol components and isocyanate components, electrically conductive agents, foaming agents (water, low-boiling materials, gaseous materials and the like), cross-linking agents, surfactants, catalysts, foam stabilizers and the like may be added as additives to the raw material mixture liquid of the above-mentioned polyurethane foam to prepare a polyurethane foam having a desired structure. A flame retardant, a filler, a conductive agent such as an ionic conductive agent or an electronic conductive agent, a known filler or cross-linking agent, or the like can also be used as appropriate.

Examples of an ionic electroconductive additive include ammonium salts, such as perchlorates, sulfates, alkyl sulfates, carboxylates and sulfonates, of tetraethyl ammonium, tetrabutyl ammonium, dodecyl trimethyl ammonium (e.g. lauryl trimethyl ammonium), hexadecyl trimethyl ammonium, octadecyl trimethyl ammonium (e.g. stearyl trimethyl ammonium), benzyl trimethyl ammonium and modified fatty acid dimethylethyl ammonium or the like; as well as perchlorates, chlorates, hydrochlorides, bromates, iodates, fluoroborates, trifluoromethyl sulfates and sulfonates, of alkali metals or alkaline earth metals, such as lithium, sodium, potassium, calcium and magnesium.

Examples of the electronic electroconductive additive include conductive carbon blacks, such as Ketchen black and acetylene black, carbon blacks for rubbers, such as SAF, ISAF, HAF, FEF, GPE, SRF, FT and MT; oxidation-treated carbon blacks for ink; pyrolytic carbon; natural graphite; artificial graphite; electroconductive metal oxides, such as tin oxide, titanium oxide and zinc oxide; and metals, such as nickel, copper, silver and germanium. The electroconductive additives may be used singly or in combination of two or more types. Although there is no particular restriction on the content thereof and the content may be selected appropriately according to need, the electroconductive additive is usually added in a ratio of 0.1 to 40 parts by mass, preferably 0.3 to 20 parts by mass based on 100 parts by mass of the total amount of a polyol and an isocyanate.

Examples of a catalyst to be used for a curing reaction of a polyurethane foam include monoamines, such as triethylamine and dimethylcyclohexylamine; diamines, such as tetramethylethylenediamine, tetramethylpropanediamine and tetramethylhexanediamine; triamines, such as pentamethyldiethylenetriamine, pentamethyldipropylenetriamine and tetramethylguanidine; cyclic amines, such as triethylenediamine, dimethylpiperazine, methylethylpiperazine, methylmorpholine, dimethylaminoethylmorpholine and dimethylimidazole; alcoholamines, such as dimethylaminoethanol, dimethylaminoethoxyethanol, trimethylaminoethylethanolamine, methylhydroxyethylpiperazine and hydroxyethylmorpholine; etheramines, such as bis(dimethylaminoethyl) ether and ethylene glycol bis(dimethyl)aminopropyl ether; and organometal compounds, such as stannous octoate, dibutyltin diacetate, dibutyltin dilaurate, dibutyltin mercaptide, dibutyltin thiocarboxylate, dibutyltin dimaleate, dioctyltin mercaptide, dioctyltin thiocarboxylate, phenylmercury propionate and lead octenate. Any of such catalysts may be used singly or in combination of two or more thereof.

According to the present invention, a silicone foam stabilizer or various surfactants are preferably added to raw materials for the polyurethane foam in order to stabilize cells of the foam product. As the silicone foam stabilizer, a dimethylpolysiloxane-polyoxyalkylene copolymer or the like, is used preferably and a copolymer containing a dimethylpolysiloxane segment having a molecular weight of 350 to 15,000 and a polyoxyalkylene segment having a molecular weight of 200 to 4,000 is especially preferable. The molecular structure of the polyoxyalkylene segment is preferably an addition polymer of ethylene oxide or an addition copolymer of ethylene oxide and propylene oxide, and the molecular termini are preferably formed by ethylene oxide. Examples of the surfactant include an ionic surfactant, such as a cationic surfactant, an anionic surfactant and an amphoteric, and a nonionic surfactant, such as various polyethers and various polyesters. Any of the above may be used singly or in combination of two or more thereof. The amount of the silicone foam stabilizer or the surfactant to be added to 100 parts by mass of the total amount of a polyol component and an isocyanate component is preferably 0.1 to 10 parts by mass and more preferably 0.5 to 5 parts by mass.

As the method for foaming of the above-mentioned polyurethane foam of the present invention, methods such as mechanical frothing (mechanical frothing by mechanical stirring while mixing an inert gas in the raw material), water frothing and foaming agent-frothing, which have been conventionally used, may be used. Here, the inert gas used in the mechanical frothing may be a gas which is inert in the polyurethane reaction, and examples thereof include inert gases in the narrow sense such as helium, argon, xenon, radon and krypton; and gases which are not reactive with the raw material of the polyurethane foam, such as nitrogen, carbon dioxide and dry air.

In the present invention, the elastic layer composed of a polyurethane foam preferably comprises on the surface a cell opening which communicates from the inside. Due to the existence of such a communicating cell opening, toner is favorably supplied from the inside of the foam, which solves a problem that the toner convey amount is unstable. Preferably, the diameter of the cell opening is 50 to 1000 µm, and the number of opening on the surface of the polyurethane foam per 1 $cm^2$ is 100 to 2000. The formation of a polyurethane foam to obtain a structure comprising such a cell opening can be performed based on conventional technique using a combination of polyurethane blending and mold releasing agent.

EXAMPLES

The present invention will now be described more concretely by way of the Examples.

A roller member formed by a metal solid shaft (length: 250 mm, diameter: 6 mm) and an elastic layer composed of a polyurethane foam as a resin foam which was attached and fixed on the outer periphery of the shaft in a columnar shape having the outer diameter of 15 mm and the length of 220 mm was prepared. The polyurethane foam of the elastic layer was obtained by cutting out a block polyurethane foam such that the axial direction is in parallel to the foaming direction of the block polyurethane foam. The material was ester-based, and the average cell diameter was 270 μm, and the hardness was 80 Ask-F.

For a cylindrical forming tool m, a metal pipe (SUS304, inner diameter: 14.1 mm, thickness: 1.5 mm) each having the inner peripheral surface shape listed on Table below was prepared. The above-mentioned roller member was inserted into the metal pipe from one end of the metal pipe (transfer process). The compression rate of the elastic layer of the roller member was 11%.

Figure 5:
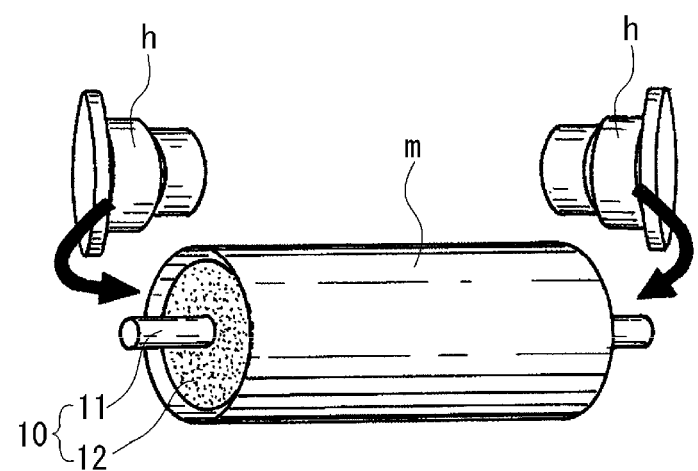
FIG. 5 is an illustration drawing illustrating a holding member.

Each roller member together with a metal pipe was heated at 150° C. for 60 minutes by a heating apparatus in a state in which both sides of the shaft of the roller member are retained by holding members h by attaching the holding member h illustrated in FIG. 5 on both sides of the metal pipe into which the roller member was inserted. After the heating, the temperature was lowered to normal temperature and the roller member was taken out from the metal pipe. Each of the obtained test rollers has the outer diameter of 14 mm. For each test roller, evaluation was performed in accordance with the following, and the results thereof are listed on the Table below in combination.

<Toner Conveying Performance>

The polyurethane foam of the elastic layer of each test roller was filled with toner and the test roller was rolled in a state in which the roller is pressed by 1 mm and was rolled for a width of 220 mm, and the weight of toner discharged per a distance of 50 mm was measured. Regarding the toner conveying performance, when the weight of toner was 0.20 g or larger, the evaluation was "o" (favorable); when the weight of toner was less than 0.20 g, the evaluation was "x" (unfavorable).

<Image Density>

Each test roller was mounted to a corresponding printer to perform an image output test, and the image density was measured using a transmission densitometer. When the image density reached a prescribed value, the evaluation was "o" (favorable); when the image density did not reach a prescribed value, the evaluation was "x" (unfavorable).

<Scraping Performance>

A metal sleeve on the surface of which toner is applied uniformly was revolved at 32 rpm, and each test roller was pressed onto the metal sleeve at a pressing amount of 1 mm for 10 seconds. Thereafter, residual toner on the metal sleeve was collected and the amount of the residual toner was converted into numbers using a transmission densitometer. The higher the scraping performance, the smaller the amount of residual toner, and thus the lower the transmission density. When the transmission density was less than 1.10, the evaluation was "o" (favorable); when the transmission density was 1.10 or higher, the evaluation was "x" (unfavorable).

<Ghost Image>

Each test roller was mounted to a corresponding printer to perform an image output test, and whether a ghost image caused by unfavorable scraping performance was observed on a printed image or not was visually confirmed. When a ghost image was not observed, the evaluation was "o" (favorable); when a ghost image was observed, the evaluation was "x" (unfavorable).

<Fluffing>

Each test roller was mounted to a corresponding printer to perform an image output test, and the presence or absence of fluffing on each tested roller was visually confirmed.

<Vertical Stripe on Image>

Each test roller was mounted to a corresponding printer to perform an image output test, and whether a vertical stripe caused by a fluff was observed on a printed image or not was visually confirmed. When a vertical stripe was not observed, the evaluation was "o" (favorable); when a vertical stripe was observed, the evaluation was "x" (unfavorable).

TABLE 1

| | | | Comparative Example 1 | Example 1 | Example 2 | Example 3 | Example 4 | Comparative Example 2 |
|---|---|---|---|---|---|---|---|---|
| Transfer process | | | Yes | Yes | Yes | Yes | Yes | No |
| Inner peripheral surface shape of cylindrical forming tool | | | Smooth surface | Irregular concaves and convexes | Irregular concaves and convexes | Longitudinal direction recessed groove | Longitudinal direction recessed groove | — |
| Outer peripheral surface shape of elastic layer | | | Smooth surface | Irregular concaves and convexes | Irregular concaves and convexes | Longitudinal direction projecting stripe | Longitudinal direction projecting stripe | Polished surface |
| Elastic layer outer peripheral surface | Irregular concaves and convexes | Ra (μm) | — | 19 | 52 | — | — | — |
| | | Rzjis (μm) | — | 74 | 294 | — | — | — |
| | | RSm (μm) | — | 189 | 1930 | — | — | — |
| | | Rsk (μm) | — | 0.7 | 0.6 | — | — | — |
| | Projecting stripe | Height (μm) | — | — | — | 300 | 750 | — |
| | | Pitch (μm) | — | — | — | 600 | 1800 | — |
| | | Width (μm) | — | — | — | 300 | 900 | — |
| Evaluation results | Toner conveying performance | | 0.15 g x | 0.24 g o | 0.32 g o | 0.21 g o | 0.35 g o | 0.37 g o |
| | Image density | | x | o | o | o | o | o |
| | Scraping performance | | 1.03 o | 1.02 o | 1.05 o | 1.03 o | 1.04 o | 1.12 x |
| | Ghost image | | o | o | o | o | o | x |
| | Fluffing | | No | No | No | No | No | Yes |
| | Vertical stripe on image | | o | o | o | o | o | x |

As illustrated in above Table 1 in each of the test rollers of Examples obtained by using a roller member in which a roller member was inserted into a cylindrical forming tool having on the inner peripheral surface irregular concaves and convexes or a recessed groove along the longitudinal direction and heated, and the irregular concaves and convexes or the recessed groove along the longitudinal direction were transferred on the surface of the roller member, it was confirmed that favorable results were obtained for all of the evaluation items of the toner conveying performance, image density, scraping performance, ghost image, fluffing, and vertical stripe on image.

DESCRIPTION OF SYMBOLS

1 Toner supply roller
2,12 Elastic layer
10 Roller member
11 Shaft
20 Toner
21 Image forming body
22 Developing roller
23 Toner storing unit
24 Layer forming blade
25 Charging roller
26 Transfer roller
27 Cleaning unit
28 Cleaning blade
31 Concave portion
32 Convex portion
33 Cell opening
34 Projecting stripe
51 Sizer
m Cylindrical forming tool

The invention claimed is:

1. A method for manufacturing a toner supply roller characterized by comprising:
   an insertion process in which a roller member comprising a shaft and an elastic layer composed of a foam having a columnar shape supported on the outer periphery of the shaft is inserted into a cylindrical forming tool having on the inner peripheral surface irregular concaves and convexes or a recessed groove along the longitudinal direction, wherein the roller member after insertion is moved in a direction opposite to the insertion direction;
   a transfer process in which the roller member inserted into the cylindrical forming tool is heated and the irregular concaves and convexes or the recessed groove along the longitudinal direction on the inner peripheral surface of the cylindrical forming tool are transferred on the surface of the roller member; and
   a releasing process in which the roller member on the surface of which the irregular concaves and convexes or the recessed groove along the longitudinal direction are transferred is taken out from the cylindrical forming tool to obtain a roller.

2. The method for manufacturing a toner supply roller according to claim 1, wherein the foam is a polyurethane foam.

3. The method for manufacturing a toner supply roller according to claim 1, wherein the elastic layer having a columnar shape is obtained by cutting out from a block foam.

4. The method for manufacturing a toner supply roller according to claim 3, wherein the elastic layer having a columnar shape is cut out from the block foam such that the axial direction of the columnar shape is in parallel to the foaming direction of the block foam.

* * * * *